United States Patent
Sethi

(10) Patent No.: US 10,555,219 B1
(45) Date of Patent: Feb. 4, 2020

(54) DYNAMIC SINGLE CHANNEL PER CARRIER WITH IMPLICIT DYNAMIC BANDWIDTH ALLOCATION

(71) Applicant: Yogesh Sethi, Germantown, MD (US)

(72) Inventor: Yogesh Sethi, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/298,219

(22) Filed: Mar. 11, 2019

(51) Int. Cl.
*H04W 28/20* (2009.01)
*H04W 72/04* (2009.01)
*H04B 7/155* (2006.01)
*H04B 7/185* (2006.01)

(52) U.S. Cl.
CPC ............ *H04W 28/20* (2013.01); *H04B 7/155* (2013.01); *H04B 7/18528* (2013.01); *H04W 72/0453* (2013.01)

(58) Field of Classification Search
CPC .................................................... H04W 28/20
USPC ........................................................ 455/427
See application file for complete search history.

(56) References Cited

PUBLICATIONS

Becker et al., "Asynchronous Scrambled Coded Multiple Access (A-SCMA)—A New High Efficiency Random Access Method," 2016 IEEE 84th Vehicular Technology Conference (VTC-Fall), 2016.
Eroz et al., "Scrambled Coded Multiple Access", Published in: 2011 IEEE Vehicular Technology Conference (VTC Fall), Sep. 5-8, 2011, DOI: 10.1109/VETECF.2011.6093091.
Lin-Nan Lee et al., "Scrambled Coded Multiple Access Variations and Improvements", Global Communications Conference (GLOBECOM) 2018 IEEE, pp. 1-7, 2018.

*Primary Examiner* — Joel Ajayi
(74) *Attorney, Agent, or Firm* — Capital City Techlaw; Jasbir Singh

(57) ABSTRACT

A method to provide dedicated bandwidth, the method including: provisioning transmitters to transmit over a satellite link; generating, for each of the transmitters, a respective transmit signal using a common codeblock asynchronous sub-carrier multiple access (A-SCMA) encoding for a respective information stream; transmitting, via the satellite link, the respective transmit signal from each of the transmitters; and varying a bandwidth rate of each of the respective transmit signals with a grant-free protocol, where the bandwidth rate of the respective transmit signals is less than or equal to a maximum system rate, the transmitting of at least two or more of the transmitters is at least partially concurrent, and each of the respective transmit signals is modulated at a common frequency over a common frequency band with a common polarization. The method reduces latency, jitter, and provides dynamic bandwidth allocation without allocation feedback.

17 Claims, 2 Drawing Sheets

DYNAMIC SINGLE CHANNEL PER CARRIER WITH IMPLICIT DYNAMIC BANDWIDTH ALLOCATION

FIELD

A system and method to provide dedicated bandwidth for Committed Information Rate (CIR) terminals using Sub-Carrier Multiple Access (SCMA) or Asynchronous Sub-Carrier Multiple Access (A-SCMA) coding. In some embodiments, the CIR terminals may be Single Channel Per Carrier (SCPC) terminals that are allocated dynamically varying or additional bandwidth up to a Peak Information Rate (PIR) without the need for an allocation feedback.

BACKGROUND

Static Single Channel Per Carrier (SCPC) bandwidth allocation has limitations in a dynamic environment when the bandwidth required by terminals changes. Most users of the static SCPC require a minimum Committed Information Rate (CIR) with additional dynamic bandwidth usage in real-time.

SCPC refers to a Very Small Aperture Terminal (VSAT) satellite transmission system that uses a separate carrier for each of its channels. In an SCPC system, transmissions are sent to a satellite continuously on a single satellite carrier. The satellite signal is received at a single location, in the case of a point-to-point system, or at many locations in a broadcast system, providing hubless connectivity among multiple sites. to using a single signal at a given frequency and bandwidth. Most often, this is used on broadcast satellites to indicate that radio stations are not multiplexed as subcarriers onto a single video carrier, but instead independently share a transponder.

As illustrated in FIG. 3A, prior art SCPC implementations use employ a large number of closely spaced subcarriers that are transmitted in parallel using either a static allocation or a feedback based dynamic allocation. The prior art dynamic allocation feedback system wastes bandwidth for the feedback and is slow as the control loop for the feedback may traverse over satellite transmission hops. Moreover, frequency bandwidth reallocation disturbs every other SCPC terminals in the network as a bandwidth increase for a terminal needs a reduction elsewhere in the system.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose dynamic bandwidth allocation without feedback and provide effective bandwidth (for example, about 30% or more) over competing methods, for example, when comparing a Quadrature Phase-Shift Keying (QPSK) mode of operation.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to provide dedicated bandwidth, the method including: provisioning transmitters to transmit over a satellite link; generating, for each of the transmitters, a respective transmit signal using a common codeblock Asynchronous Sub-Carrier Multiple Access (A-SCMA) encoding for a respective information stream; transmitting, via the satellite link, the respective transmit signal from each of the transmitters; and varying a bandwidth rate of each of the respective transmit signals with a grant-free protocol, where the bandwidth rate of the respective transmit signals is less than or equal to a maximum system rate, the transmitting of at least two or more of the transmitters is at least partially concurrent, and each of the respective transmit signals is modulated at a common frequency over a common frequency band with a common polarization. Other embodiments of this aspect include corresponding computer systems, apparatus, and computer programs recorded on one or more computer storage devices, each configured to perform the actions of the methods.

Implementations may include one or more of the following features. The method where the bandwidth rate of at least two of the respective transmit signals is less than or equal to a Committed Information Rate (CIR), and the CIR is less than the maximum system rate. The method where the provisioning configures each of the transmitters to initiate a transmission at an instant unique to each of the transmitters. The method further including: receiving the respective transmit signals as a composite wave; and separating each of the respective transmit signals from the composite wave. The method where the provisioning includes setting a maximum count of the transmitters for the satellite link to be less than or equal to 136% of the maximum system rate divided by a CIR. The method further including creating randomness across the transmitters, where at least one of the transmitters transmits information in a burst mode. The method where a start of the transmitting is aligned with a frame start. The method where a start of the transmitting starts when information for transmission is received by one of the transmitters. The method where the transmitting operates in a burst mode. The method where the transmitting operates in a continuous mode. The method where the common codeblock is not aligned across the transmitters. The method where the varying of the bandwidth rate of each of the respective transmit signals is dynamic. The method where. The method may also include the varying permits the bandwidth rate of one of the respective transmit signals to exceed a cir for a threshold percent of an allocation period. The method may also include the bandwidth rate is less than or equal to a Peak Information Rate (PIR). The method may also include the maximum system rate is greater than the PIR and the PIR is greater than or equal to the CIR. The method where the bandwidth rate for each of the respective transmit signals is limited to a rate less than the pir for an allocation period. The method where each of the transmitters determines its bandwidth rate and each of the transmitters limits its bandwidth rate to be less than the CIR. The method where the satellite link is a 2 m channel encoded with QPSK r1/10, the CIR is 200 kbps, the PIR is 300 kbps and a count of the transmitters is between 20 to 30. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
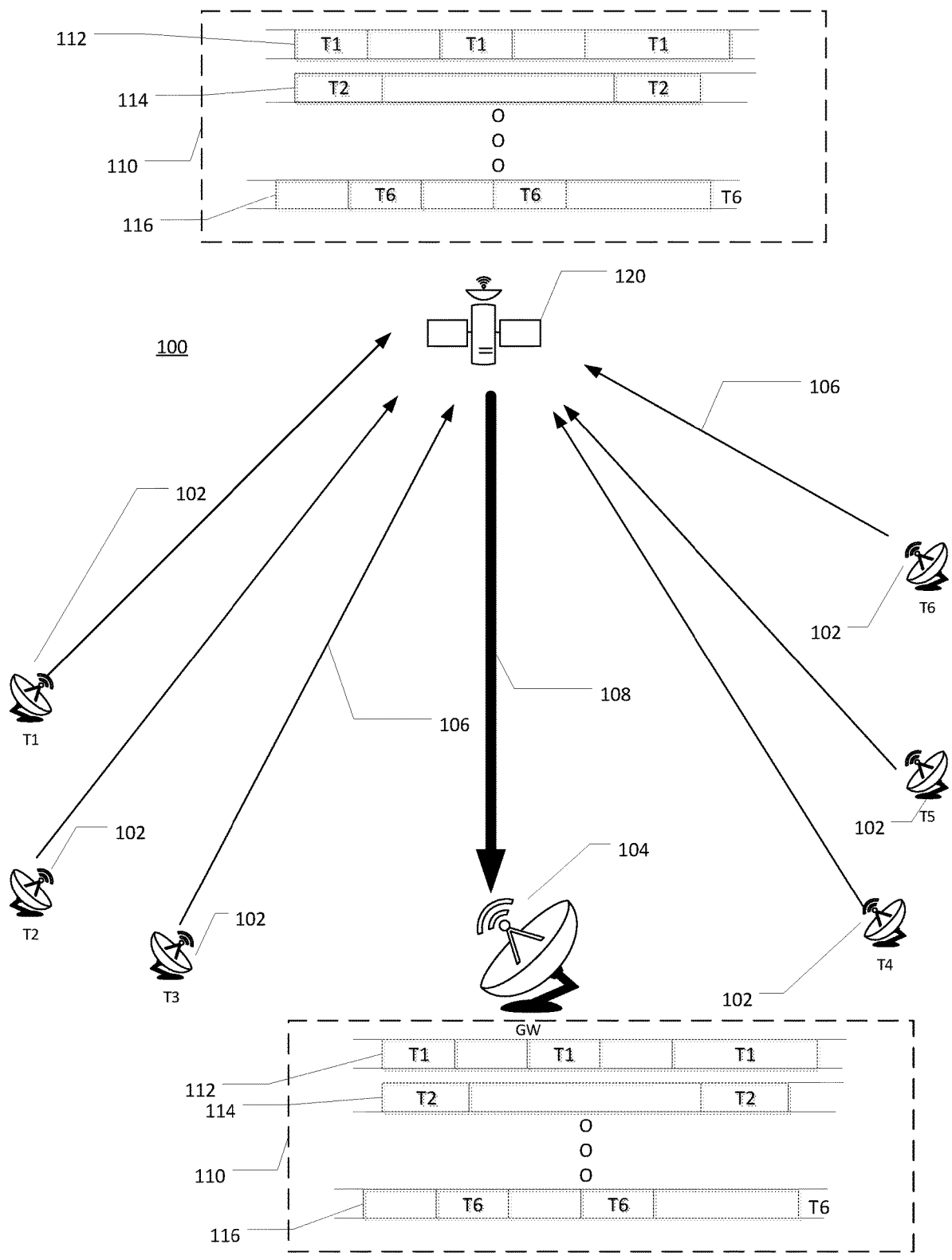
FIG. 1 illustrates an exemplary Sub-Carrier Multiple Access (SCMA) system with implicit dynamic bandwidth allocation according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Scrambled coded multiple access (SCMA) is a multiple access scheme that allows different transmitters transmit at the same time using the same frequency. User differentiation is achieved thanks to transmitter specific scrambling sequences at the transmitter, and soft-in soft-out iterative interference cancellation at the receiver. Asynchronous SCMA (A-SCMA) lets the transmitters transmit in an asynchronous manner where the different transmitters' codeblocks are not aligned. This removes the need for tight coordination between transmitters, and improves overloading capability due to the fact that codeblocks interfere with each other only partially, FIG. 1 illustrates an exemplary CIR system with implicit dynamic bandwidth allocation according to various embodiments.

A CIR system 100 may include a plurality of transmitters 102 assigned to a respective satellite link 106 to be relayed by a satellite 120 to a receiver 104. The transmitters 102 may include a terminal, a Very Small Aperture Terminal (VSAT) or the like. The receiver 104 may include a satellite hub or gateway. Each of the respective satellite links 106 for the plurality of transmitters 102 have a common carrier frequency, frequency band and polarization. In exemplary embodiments, a signal-to-noise ratio, a power level, doppler shift, and other settings for each of the plurality of transmitters 102 may differ from one another. The CIR system 100 may be allocated a frequency band modulated at a carrier frequency. Each of the plurality of transmitters 102 may concurrently transmit a signal over the frequency band modulated at the carrier frequency using an A-SCMA, SCMA or the like scheme.

The transmitter 102 (T1) may transmit information per a signal 112 over its respective satellite link 106. Similarly, the transmitter 102 (T2) may transmit information per a signal 114 over its respective satellite link 106, and the transmitter 102 (T6) may transmit information per a signal 116 over its respective satellite link 106. The satellite 120 receives the signals 112, 114, and 116 as a composite wave 110. All of the signals 112, 114, and 116 use the same carrier frequency, frequency band and polarization to form the composite wave 110. The composite wave 110 may include information from a remaining of the plurality of transmitters 102. The composite wave 110 is relayed to the receiver 104 by the satellite 120 as a composite signal 108. The receiver 104 the composite wave 110 into individual information signals for each of the plurality of SCMA transmitters 102. The individual information signals are processed by a satellite hub or gateway (not shown).

FIG. 1 illustrates inroutes or return links, from terminals to a satellite hub, of the plurality of transmitters 102. The teachings of the present disclosure are also applicable to the outroutes or forward links, from a satellite hub to terminals.

In an exemplary system, for a 2048 kilo symbols per second (ksps) SCMA channel encoded with Quadrature Phase Shift Keying (QPSK), an R1/9 error coding, extra Unique Word and Pilot insertion, an effective coding rate is approximately R1/12.5 or 8000 bits transmitted for 640 bits of information bits. This provides a transmitter having a maximum system rate or throughput of 327.68 ksps (2048*2*1/12.5) per transmitter. A comparable throughput for a 2M channel QPSK R9/10 is 3686.4 kbps (2048*2*0.9). As such, SCMA becomes more efficient than Time Division Multiple Access (TDMA) QPSK R9/10, when more than 11.25 terminals average may be supported on a 2M channel (3686.4 kbps/327.68 kbps=11.26).

In an exemplary system, an estimated 16 users (lambda) or terminals can be accommodated in an A-SCMA channel. As such, a maximum system rate or throughput of an SCMA band using A-SCMA over a 2M channel is 327.68 kbps*16=5242.88, and can thus provide better bandwidth than QPSK R9/10 maximum 2M channel (3686.4 kbps as calculated above).

| Use Case | Forward CIR Kbps | Forward PIR Kbps | Return CIR Kbps | Return PIR Kbps | # sites | Devices/Site |
|---|---|---|---|---|---|---|
| #1 - Enterprise | 128 | 512 | 50 | 1000 | 300 | 10 |
| #2 - 2G backhaul | 200 | 300 | 200 | 300 | 100 | 30 |
| #3 - USO/Schools | 200 | 512 | 64 | 512 | 1000 | 20 |
| #4 - WiFi backhaul | 300 | 512 | 100 | 512 | 500 | 50 |
| #5 - 3G backhaul | 512 | 2000 | 512 | 2000 | 300 | 30 |
| #6 - 4G backhaul | 2000 | 10000 | 1000 | 5000 | 500 | 50 |

Other exemplary use cases of the present teachings are listed in the table below. All of them except for one (consumer BB) need a CIR greater than 128 kbps, and the typical network is on the order of several hundred sites. The table above lists a variety of use cases for supporting a plurality of return links. In some embodiments, when employing A-SCMA @4 Msps (instead of 2 Msps described earlier), additional use cases for the present teachings are possible. For example, #1—Enterprise (Partial as PIR will be limited to approx. 600 kbps), #2—2G Backhaul, #3—USO/Schools, and #4—WiFi backhaul.

An Inroute Use Case Study

If a site has traffic varying between 200 kpbs (CIR) to 300 kbps (PIR) with a Link Budget closure for QPSK R9/10, the TDMA system can support 18.4 sites (3686.4 kbps/200 kbps per site=18.4 sites (assuming that some oversubscription is already included as each site will vary in rate from 200 kbps to 300 kbps)).

For a A-SCMA system, if a site has traffic varying between 200 kpbs (CIR) to 300 kbps (PIR) with a Link Budget closure for QPSK R1/10, the A-SCMA system can support 26.2 sites (5242.88 kbps/200 kbps per site=26.2. As such, an A-SCMA system may support approximately 20 to 30 sites (with 200 kbps-300 kbps) traffic with some randomness assumed. The number of supported sites for the same spectrum allocation may provide up to a 36% gain over a TDMA system using QPSK R9/10. Creating randomness across the 20 to 30 sites may provide better results in the A-SCMA efficiency.

In addition to efficiency, there is additional advantage. Each terminal may transmit continuously (up to 327.68 kbps) or in burst mode, whenever it has traffic. This is basically an SCPC with dynamic bandwidth. Furthermore, there may be reduced latency and jitter due to absence of a bandwidth feedback control that permits use of a grant-free protocol to allocate bandwidth.

Figure 2:
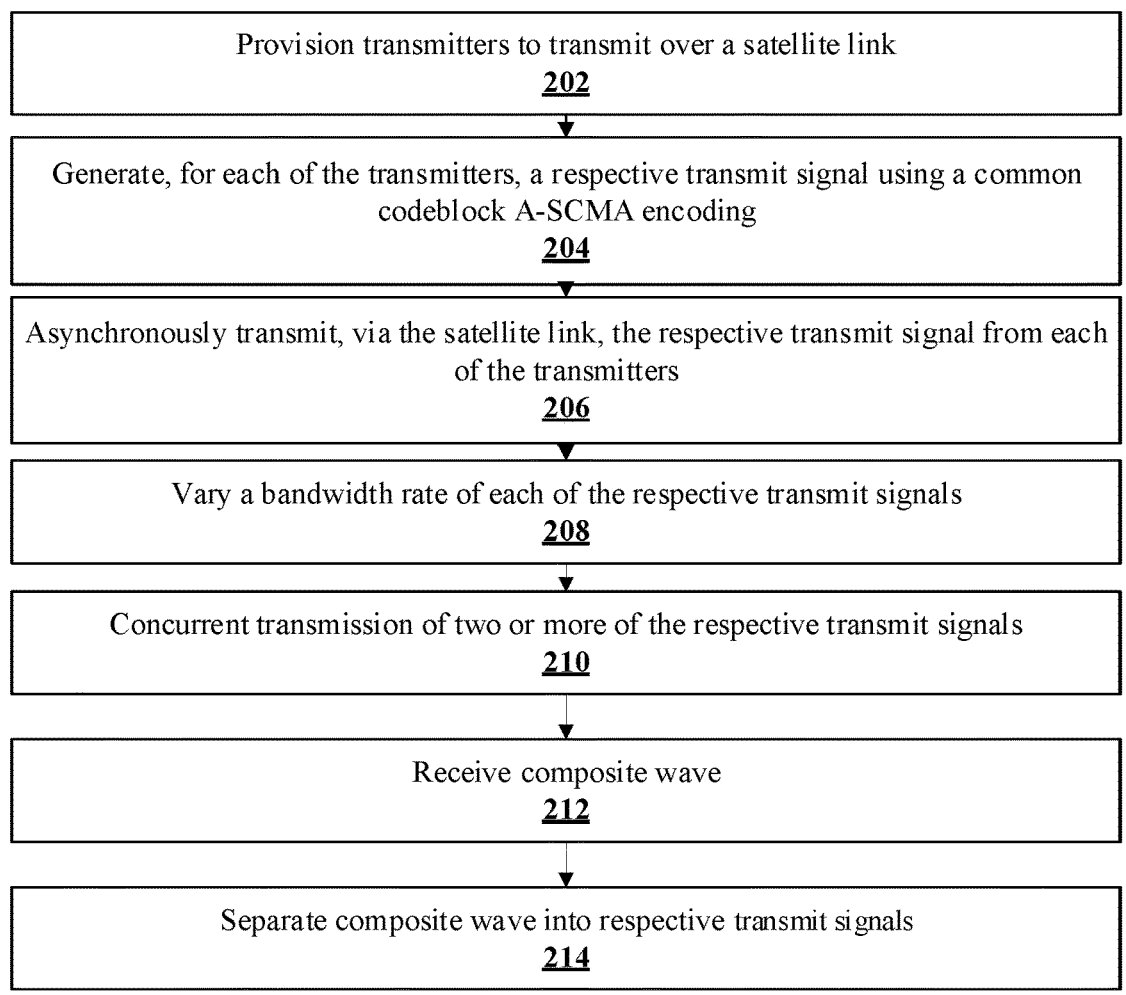
FIG. 2 illustrates a method to provide dedicated bandwidth to a plurality of subscribers according to various embodiments.

FIG. 2 illustrates a method to provide dedicated bandwidth to a plurality of subscribers according to various embodiments.

A method 200 to provide dedicated bandwidth to a plurality of subscribers is described. Operation 202 of the method 200 provisions transmitters to transmit over a satellite link. Operation 202 may identify a channel (carrier frequency, frequency band and polarization), a CIR, a PIR, a minimum information rate and the like to each of the transmitters. Operation 204 of the method 200 may generate, for each of the transmitters, a respective transmit signal using a A-SCMA encoding scheme with a common codeblock for a respective information stream associated with each of the transmitters. The information stream may include data for radio transmission from a VSAT, a gateway or the like.

Operation 206 of the method 200 asynchronously transmits, via the satellite link, the respective transmit signal from each of the transmitters. In some embodiments, each of the transmitters determines its transmission rate and each of the transmitters limits its transmission rate to be less than CIR. In some embodiments, each of the transmitters determines its transmission rate and each of the transmitters permits the bandwidth rate for each of the transmitters to exceed the CIR for a threshold percent of an allocation period, and the bandwidth rate is less than or equal to a Peak Information Rate (PIR).

Operation 208 of the method 200 may vary a bandwidth rate of each of the respective transmit signals. Operation 210 of the method may overlap transmissions or concurrently transmit with two or more the transmitters. In some embodiments, a start of the transmitting is aligned with a frame start. In some embodiments, a start of the transmitting starts when information for transmission is received by one of the SCMA transmitters. In some embodiments, the transmitting operates in a burst mode. In some embodiments, the transmitting operates in a continuous mode.

Operation 212 of the method 200 may receive a composite wave. The composite wave may be formed as a function of receiving simultaneous transmissions from one or more transmitters on the satellite link. Operation 214 of the method 200 may separate the composite wave into respective transmit signals. Each of the respective transmit signals may identify the transmitter that originated the transmission.

Figure 3A:
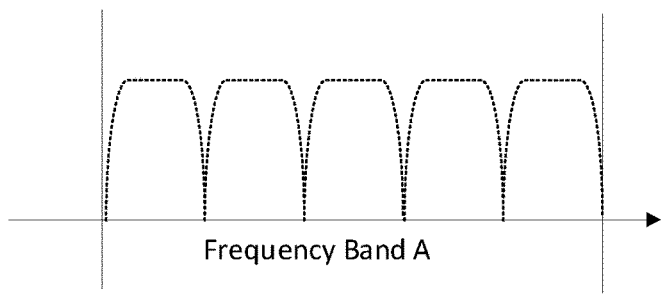
FIG. 3A illustrates employing a large number of closely spaced subcarriers that are transmitted in parallel for SCPC channels in the prior art.
Figure 3B:
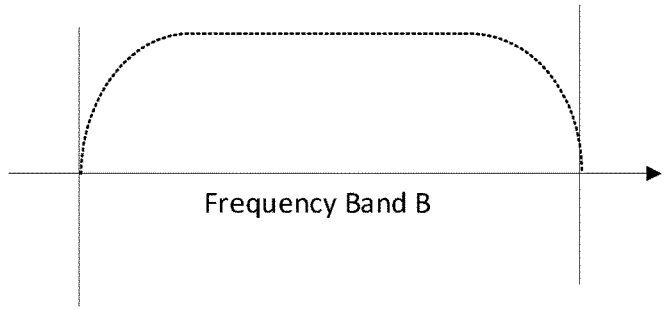
FIG. 3B illustrates transmitting a high-rate stream of data with a single subcarrier over a frequency band for SCPC channels according to various embodiments.

FIG. 3B illustrates transmitting a high-rate stream of data with a single subcarrier over a frequency band for SCPC channels according to various embodiments. When Frequency Band A of FIG. 3A is equal in size to Frequency Band B of FIG. 3B, a network or method implementing the present teachings per FIG. 3B provides a greater bandwidth. By extension a network or method implementing the present teachings per FIG. 3B can provide the same bandwidth when Frequency Band B of FIG. 3B is smaller in size than Frequency Band A of FIG. 3A.

While example embodiments of the present invention may provide for various implementations (e.g., including hardware, firmware and/or software components), and, unless stated otherwise, all functions are performed by a CPU or a processor executing computer executable program code stored in a non transitory memory or computer readable storage medium, the various components can be implemented in different configurations of hardware, firmware, software, and/or a combination thereof.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

I claim:

1. A method for providing dedicated bandwidth to a satellite gateway, the method comprising:
provisioning satellite terminals, each satellite terminal comprising a transmitter to transmit over a satellite link;
generating, at a respective satellite terminal for each of the transmitters, a respective transmit signal using a common codeblock Asynchronous Scrambled Coded Multiple Access (A-SCMA) encoding for a respective information stream;

transmitting, via the satellite link, the respective transmit signal from each of the transmitters; and varying, at the respective satellite terminal, a bandwidth rate of each of the respective transmit signals without feedback based dynamic allocation from the satellite gateway, wherein the bandwidth rate of the respective transmit signals is less than or equal to a maximum system rate, the transmitting from at least two or more of the transmitters is at least partially concurrent, each of the respective transmit signals is modulated at a common frequency over a common frequency band with a common polarization, the provisioning comprises setting a maximum count of the transmitters for the satellite link to be less than or equal to 136% of the maximum system rate divided by a CIR, and the satellite gateway receives the respective transmit signals as a composite wave and separates each of the respective transmit signals from the composite wave.

2. The method of claim 1, wherein the bandwidth rate of at least two of the respective transmit signals is less than or equal to a Committed Information Rate (CIR), and the CIR is less than the maximum system rate.

3. The method of claim 1, wherein the provisioning configures each of the transmitters to initiate a transmission at an instant unique to each of the transmitters.

4. The method of claim 1, further comprising: receiving the respective transmit signals as a composite wave; and separating each of the respective transmit signals from the composite wave.

5. The method of claim 1, further comprising creating randomness across the transmitters, wherein at least one of the transmitters transmits information in a burst mode.

6. The method of claim 1, wherein a start of the transmitting is aligned with a frame start.

7. The method of claim 1, wherein a start of the transmitting starts when information for transmission is received by one of the transmitters.

8. The method of claim 1, wherein the transmitting operates in a burst mode.

9. The method of claim 1, wherein the transmitting operates in a continuous mode.

10. The method of claim 1, wherein the common codeblock is not aligned across the transmitters.

11. The method of claim 1, wherein the varying of the bandwidth rate of each of the respective transmit signals is dynamic.

12. The method of claim 1, wherein
the varying permits the bandwidth rate of one of the respective transmit signals to exceed a CIR for a threshold percent of an allocation period,
the bandwidth rate is less than or equal to a Peak Information Rate (PIR), and
the maximum system rate is greater than the PIR and the PIR is greater than the CIR.

13. The method of claim 12, wherein the bandwidth rate for each of the respective transmit signals is limited to a rate less than the PIR for an allocation period.

14. The method of claim 12, wherein each of the transmitters determines its bandwidth rate and each of the transmitters limits its bandwidth rate to be less than the CIR.

15. The method of claim 12, wherein the satellite link is a 2M channel encoded with QPSK R1/10, the CIR is 200 kbps, the PIR is 300 kbps and a count of the transmitters is between 20 to 30.

16. A system to provide dedicated bandwidth, the system comprising:

satellite terminals, each satellite terminal comprising a transmitter to transmit over a satellite link; and a satellite gateway, wherein each of the transmitters generates a respective transmit signal using a common codeblock Asynchronous Scrambled Coded Multiple Access (A-SCMA) encoding for a respective information stream, the respective transmit signal from each of the transmitters is transmitted to the satellite gateway via the satellite link; and a bandwidth rate of each of the respective transmit signals is varied, at the respective satellite terminal without feedback based dynamic allocation from the satellite gateway, the bandwidth rate of the respective transmit signals is less than or equal to a maximum system rate, the transmitting from at least two or more of the transmitters is at least partially concurrent, each of the satellite terminals modulates the respective transmit signals at a common frequency over a common frequency band with a common polarization, a maximum count of the transmitters for the satellite link is set by the satellite gateway to be less than or equal to 136% of the maximum system rate divided by a CIR, and the satellite gateway receives the respective transmit signals as a composite wave and separates each of the respective transmit signals from the composite wave.

17. The system of claim 16, wherein
the bandwidth rate of one of the respective transmit signals is permitted to exceed a CIR for a threshold percent of an allocation period,
the bandwidth rate is less than or equal to a Peak Information Rate (PIR), and
the maximum system rate is greater than the PIR and the PIR is greater than the CIR.

* * * * *

UNITED STATES PATENT AND TRADEMARK OFFICE
CERTIFICATE OF CORRECTION

PATENT NO. : 10,555,219 B1
APPLICATION NO. : 16/298219
DATED : February 4, 2020
INVENTOR(S) : Yogesh Sethi Page 1 of 1

It is certified that error appears in the above-identified patent and that said Letters Patent is hereby corrected as shown below:

On the Title Page

Item (57), In the Abstract Lines 4-5 for "Asynchronous Sub-Carrier Multiple Access" should read "Asynchronous Scrambled Coded Multiple Access.".

In the Specification

At Column 1, Line 7 for "Sub-Carrier Multiple Access" should read "Scrambled Coded Multiple Access".

At Column 1, Line 8 for "Asynchronous Sub-Carrier Multiple Access" should read "Asynchronous Scrambled Coded Multiple Access".

At Column 2, Line 5 for "Asynchronous Sub-Carrier Multiple Access" should read "Asynchronous Scrambled Coded Multiple Access".

At Column 3, Line 12 for "Sub-Carrier Multiple Access" should read "Scrambled Coded Multiple Access".

Signed and Sealed this
Twenty-third Day of June, 2020

Andrei Iancu
*Director of the United States Patent and Trademark Office*